United States Patent
Cao et al.

(10) Patent No.: US 7,837,979 B2
(45) Date of Patent: Nov. 23, 2010

(54) SYNTHESIS OF ITQ-12

(75) Inventors: Guang Cao, Branchburg, NJ (US); Matu J. Shah, Hackettstown, NJ (US); Sebastian C. Reyes, Branchburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 699 days.

(21) Appl. No.: 11/973,102

(22) Filed: Oct. 5, 2007

(65) Prior Publication Data

US 2008/0107594 A1   May 8, 2008

Related U.S. Application Data

(60) Provisional application No. 60/857,054, filed on Nov. 6, 2006.

(51) Int. Cl.
*C01B 39/04* (2006.01)
(52) U.S. Cl. ........................... 423/706; 423/718
(58) Field of Classification Search ............... 423/706, 423/718, 704
See application file for complete search history.

(56) References Cited

U.S. PATENT DOCUMENTS 4,000,248 A * 12/1976 Martin .................. 423/707
4,391,785 A    7/1983 Rosinski et al.
6,471,939 B1   10/2002 Boix et al.

OTHER PUBLICATIONS

Zicovich-Wilson et al, "Structure, Vibrational Analysis, and Insights into Hose-Guest Interactions in As-Synthesized Pure Silica ITQ-12 Zeolite by Periodic B3LYP Calculations", J.Am.Chem.Soc. (2007), 129, pp. 11512-11523.*
Loiseau et al, "Crystalline oxyfluorinated open-framework compounds: Silicates, metal phosphates, metal fluorides and metal-organic frameworks", Journal of Fluorine Chemistry, 128, 2007, pp. 412-422, (Sep. 2006).*
Olson, David H.; Yang, Xiaobo; Camblor, Miguel A.; ITQ-12: A Zeolite Having Temperature Dependent Adsorption Selectivity and Potential for Propene Seperation, J. Phys. Chem. B 2004, 108, 11044-11048.

* cited by examiner

*Primary Examiner*—David M Brunsman
(74) *Attorney, Agent, or Firm*—Paul E. Purwin; Bruce M Bordelon

(57) ABSTRACT

A process for synthesizing the porous crystalline material ITQ-12 is disclosed and employs an organic directing agent having the formula:

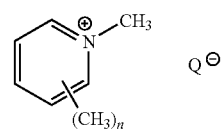

where n is an integer from 1 to 3 and $Q^-$ is an anion. The resultant ITQ-12 is useful in as a catalyst in chemical conversion reactions and as an adsorbent for gas separation.

13 Claims, 2 Drawing Sheets

SYNTHESIS OF ITQ-12

This application claims the benefit of U.S. Provisional Application No. 60/857,054 filed Nov. 6, 2006.

FIELD

This invention relates to the synthesis of the zeolite ITQ-12 and use of the resultant zeolite in gas separation.

BACKGROUND

Zeolitic materials, both natural and synthetic, have been demonstrated in the past to have utility as adsorbent materials and to have catalytic properties for various types of hydrocarbon conversion reactions. Certain zeolitic materials are ordered, porous crystalline metallosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ tetrahedra and optionally tetrahedra of a Periodic Table Group IIIA element oxide, e.g., $AlO_4$, in which the tetrahedra are cross-linked by the sharing of oxygen atoms whereby the ratio of the total Group IIIA element and silicon atoms to oxygen atoms is 1:2. The electrovalence of the tetrahedra containing the Group IIIA element is balanced by the inclusion in the crystal of a cation, for example an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-1 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

U.S. Pat. No. 6,471,939 describes the synthesis and structure of a zeolite designated ITQ-12, which is a single crystalline phase material having a 2-dimensional channel system comprising two sets of intersecting channels wherein each channel is defined by an 8-membered ring of tetrahedrally coordinated atoms. One set of 8-membered ring channels each has cross-sectional dimensions of about 3.4 Angstrom by about 4.6 Angstrom, whereas the other set of 8-membered ring channels each has cross-sectional dimensions of about 2.7 Angstrom by about 4.8 Angstrom. By virtue of its small pore size, ITQ-12 has shown promise as an adsorbent for propane/propene separation (Olson, D. H.; Yang, X.; Camblor, M. A. *J. Phys. Chem. B* 2004, 108, 11044-11048).

U.S. Pat. No. 6,471,939 discloses that ITQ-12 can be synthesized in a fluoride medium employing the 1,3,5-trimethylimidazolium cation, and preferably 1,3,5-trimethylimidazolium hydroxide, as an organic directing agent. The organic directing agent is prepared by the dimethylation of 4(5)-methylimidazole with excess methyl iodide in the presence of the inorganic base $K_2CO_3$ to neutralize the proton released by the reaction. The reaction is conducted in the polar, aprotic solvent chloroform so that the inorganic salts, $KHCO_3$ and $K_2CO_3$, remain insoluble whereas the organic salts, trimethylimidazole iodide, are soluble. However, chloroform and similar halogenated polar, aprotic solvents are classified as hazardous substances and dimethylation reactions are typically much slower than monomethylation reactions.

According to the present invention, it has now been found that ITQ-12 can be synthesized in the presence of polymethylated pyridinium cations, such as 1,2,4,6-tetramethylpyridinium cations, as an organic directing agent. Since these materials can generally be produced by monomethylation of the nitrogen atom of commercially available methylpyridine compounds, the reaction is relatively fast, does not involve the release of a proton and so does not require the presence of an inorganic base and can be conducted in benign solvents, such as ethanol.

SUMMARY

In one aspect, the present invention resides in a process for synthesizing a crystalline material having an ITQ-12 framework structure, the process comprising:

a) preparing a reaction mixture capable of forming said crystalline material having an ITQ-12 framework structure, wherein the reaction mixture comprises an organic directing agent having the following formula:

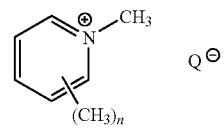

where n is an integer from 1 to 3 and $Q^-$ is an anion; and b) recovering from said reaction mixture said crystalline material having an ITQ-12 framework structure.

In a further aspect, the present invention resides in a process for synthesizing a crystalline material having an ITQ-12 framework structure and having a composition involving the molar relationship:

wherein X is at least one trivalent element; Y is at least one tetravalent element; and m is 0 to 0.2, the process comprising:

a) preparing a reaction mixture capable of forming said crystalline material having an ITQ-12 framework structure, said reaction mixture comprising a source of water, a source of an oxide of at least one tetravalent element Y, optionally a source of an oxide of at least one trivalent element X, and an organic directing agent for directing the formation of an ITQ-12 framework structure molecular sieve and having the formula:

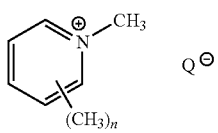

where n is an integer from 1 to 3 and Q⁻ is an anion; and b) maintaining said reaction mixture under conditions sufficient to form crystals of said crystalline material; and (c) recovering said crystalline material from (b).

Conveniently, said directing agent is a 1,2,4,6-tetramethylpyridinium compound, such as 1,2,4,6-tetramethylpyridinium hydroxide.

Typically, said reaction mixture also comprises a source of fluoride ions.

In yet a further aspect, the invention resides in the use of the crystalline material synthesized by the process described herein in gas separation, such as the separation of propane and propene mixtures.

DETAILED DESCRIPTION OF THE EMBODIMENTS

Figure 1:
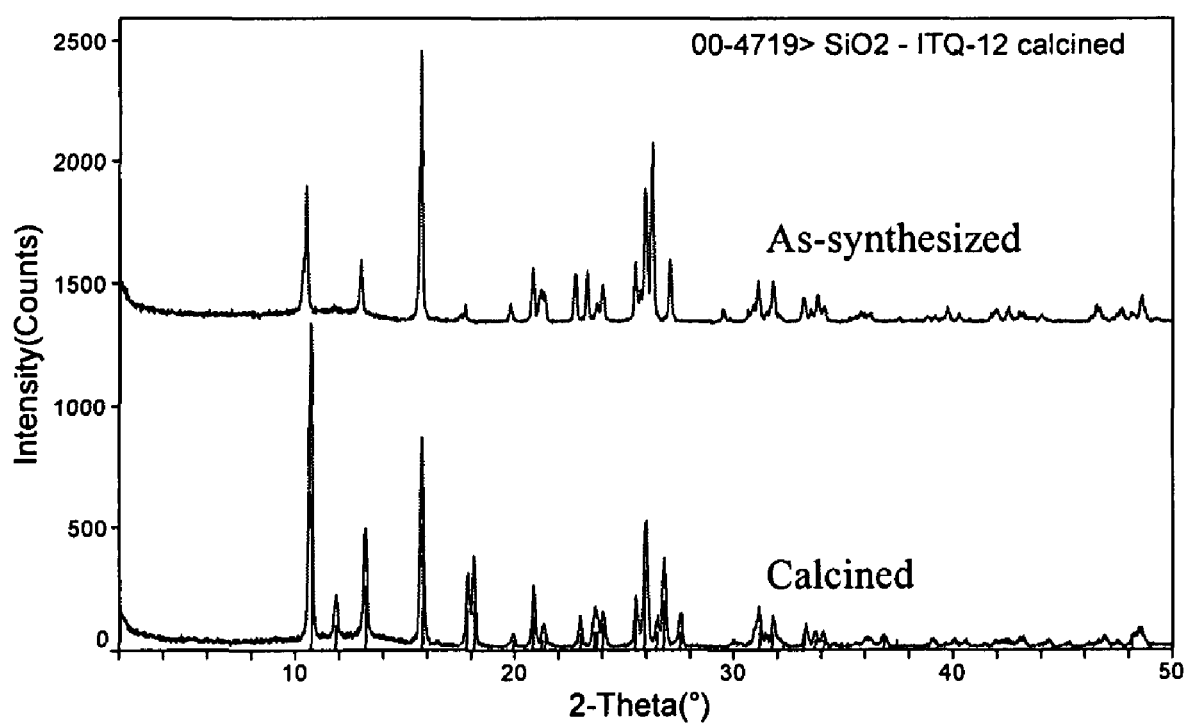
FIG. 1 gives the X-ray diffraction patterns of the as-synthesized and calcined ITQ-12 produced in Example 2.
Figure 2:
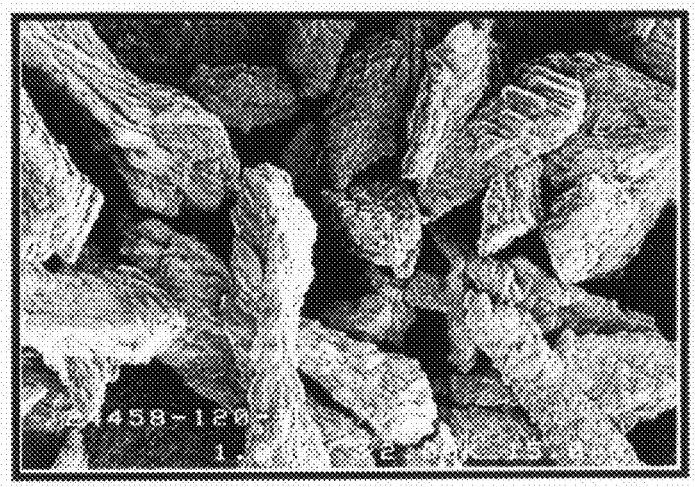
FIG. 2 compares the scanning electron micrograph (SEM) of the ITQ-12 produced in Example 2 (FIG. 2a) with the SEMs of ITQ-12 produced using 1,2,3-trimethylimidazolium hydroxide (FIG. 2b) and 1,3,4-trimethylimidazolium hydroxide (FIG. 2c) as the organic directing agent.
Figure 2:
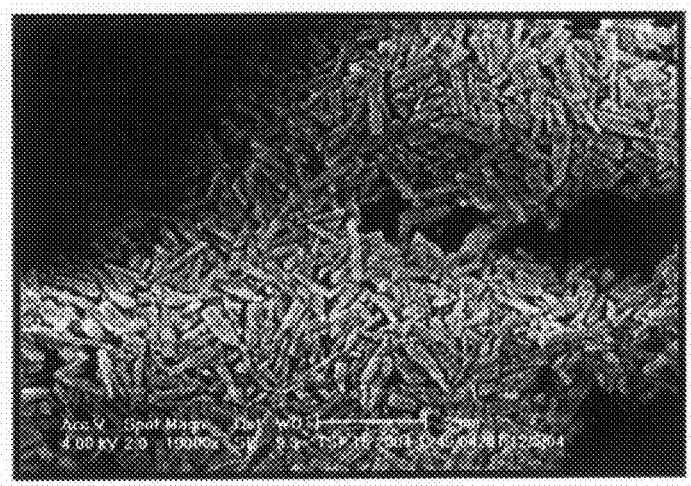
Figure 2:
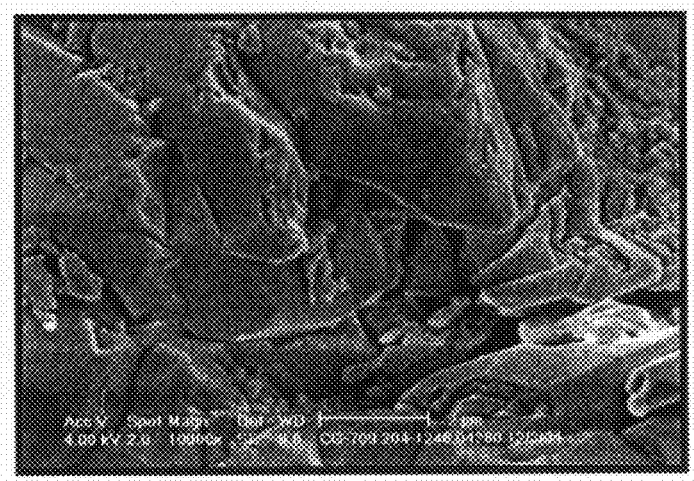

The synthetic porous crystalline material, ITQ-12, produced by the process described herein is a single crystalline phase which has a 2-dimensional channel system comprising two sets of intersecting channels wherein each channel is defined by an 8-membered ring of tetrahedrally coordinated atoms. One set of 8-membered ring channels each has cross-sectional dimensions of about 3.4 Ångstrom (Å) by about 4.6 Å, whereas the other set of 8-membered ring channels each has cross-sectional dimensions of about 2.7 Å by about 4.8 Å.

The structure of ITQ-12 may be defined by its unit cell, which is the smallest structural unit containing all the structural elements of the material. Table 1 lists the positions of each tetrahedral atom in the unit cell in nanometers; each tetrahedral atom is bonded to an oxygen atom which is also bonded to an adjacent tetrahedral atom. Since the tetrahedral atoms may move about due to other crystal forces (presence of inorganic or organic species, for example), a range of ±0.05 nm is implied for each coordinate position.

TABLE 1

| T1 | 0.645 | 0.369 | 0.088 |
| T2 | 0.563 | 0.599 | 0.569 |
| T3 | 0.547 | 0.598 | 0.263 |
| T4 | 0.153 | 0.369 | 0.767 |
| T5 | 0.236 | 0.599 | 0.285 |
| T6 | 0.252 | 0.598 | 0.591 |
| T7 | 0.153 | 1.132 | 0.767 |
| T8 | 0.236 | 0.902 | 0.285 |
| T9 | 0.252 | 0.904 | 0.591 |
| T10 | 0.645 | 1.132 | 0.088 |
| T11 | 0.563 | 0.902 | 0.569 |
| T12 | 0.547 | 0.904 | 0.263 |

TABLE 1-continued

| T13 | 0.129 | 1.120 | 0.088 |
| T14 | 0.046 | 1.350 | 0.569 |
| T15 | 0.030 | 1.348 | 0.263 |
| T16 | 0.670 | 1.120 | 0.767 |
| T17 | 0.752 | 1.350 | 0.285 |
| T18 | 0.769 | 1.348 | 0.591 |
| T19 | 0.670 | 0.381 | 0.767 |
| T20 | 0.752 | 0.152 | 0.285 |
| T21 | 0.769 | 0.153 | 0.591 |
| T22 | 0.129 | 0.381 | 0.088 |
| T23 | 0.046 | 0.152 | 0.569 |
| T24 | 0.030 | 0.153 | 0.263 |

ITQ-12 can be prepared by the present process in essentially pure form with little or no detectable impurity crystal phases and has an X-ray diffraction pattern which is distinguished from the patterns of other known as-synthesized or thermally treated crystalline materials by the lines listed in Table 2 below.

TABLE 2

| d(Å) | Relative Intensities (I) |
|---|---|
| 8.31 ± 0.2 | m-vs |
| 6.75 ± 0.15 | vw-m |
| 5.63 ± 0.15 | s-vs |
| 4.98 ± 0.15 | vw-m |
| 4.26 ± 0.15 | w |
| 3.49 ± 0.1 | w |
| 3.44 ± 0.1 | m |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacing, d's, were calculated in Angstrom units, and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80-100), s=strong (60-80), m=medium (40-60), w=weak (20-40), and vw=very weak (0-20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

In its calcined form, ITQ-12 generally has a composition involving the molar relationship:

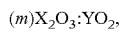

$(m)X_2O_3:YO_2$, wherein X is at least one trivalent element, such as aluminum, boron, iron, indium, and/or gallium, preferably boron; Y is at least one tetravalent element such as silicon, tin, titanium and/or germanium, preferably silicon; m is from 0 to about 0.2, usually from 0 to 0.025. It will be appreciated from the permitted values for m that ITQ-12 can be synthesized in totally siliceous form in which the trivalent element X is absent or essentially absent.

As discussed below the present process for synthesizing ITQ-12 generally employs fluoride, in particular HF, as a mineralizing agent and hence, in its as-synthesized form, ITQ-12 has a formula, on an anhydrous basis and in terms of moles of oxides per n moles of $YO_2$, as follows:

(0.04-0.5)R:(m)$X_2O_3$:$YO_2$:(0.02-0.5)F wherein R is an organic moiety. The R and F components, which are associated with the material as a result of their presence during crystallization, are easily removed by post-crystallization methods hereinafter more particularly described.

The present process for synthesizing ITQ-12 comprises preparing a reaction mixture capable of forming ITQ-12, wherein the reaction mixture comprises an organic directing agent, R, having the following formula:

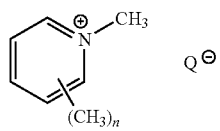

where n is an integer from 1 to 3 and $Q^-$ is an anion; and recovering the ITQ-12 from the reaction mixture.

The reaction mixture generally contains sources of water, optionally an oxide of at least one trivalent element X, e.g., aluminum and/or boron, an oxide of at least one tetravalent element Y, e.g., silicon and/or germanium, the organic directing agent (R) and fluoride ions, the reaction mixture having a composition, in terms of mole ratios of oxides, within the following ranges:

| Reactants | Useful | Preferred |
|---|---|---|
| $YO_2/X_2O_3$ | at least 5 | at least 40 |
| $H_2O/YO_2$ | 2-50 | 3-10 |
| $OH^-/YO_2$ | 0.1-1 | 0.4-0.9 |
| $F/YO_2$ | 0.1-1 | 0.4-0.7 |
| $R/YO_2$ | 0.1-1 | 0.4-0.9 |

In one embodiment, the reaction mixture generally contains sources of germania and silica such that the $GeO_2/SiO_2$ molar ratio of the mixture is from zero to about 0.5, such as from zero to about 0.3.

The organic directing agent (R) can be any dimethyl-(1,2; 1,3, 1,4) pyridinium compound, trimethyl-(1,2,3; 1,2,4; 1,2, 5; 1,2,6; 1,3,4; 1,3,5) pyridinium compound, or tetramethyl-(1,2,3,4; 1,2,3,5; 1,2,3,6, etc) pyridinium compound, but generally is a 1,2,4,6-tetramethylpyridinium compound, such as 1,2,4,6-tetramethylpyridinium hydroxide. These organic directing agents (R) can readily be produced by monomethylation of the nitrogen atom of commercially available methylpyridine compounds using methyl iodide followed, if necessary, by anion exchange of the resultant polymethylpyridinium iodide.

Crystallization of the ITQ-12 can be carried out at either static or stirred conditions in a suitable reactor vessel, such as for example, polypropylene jars or teflon lined or stainless steel autoclaves, at a temperature of about 150° C. to about 200° C. for a time sufficient for crystallization to occur at the temperature used, e.g., from about 12 hours to about 30 days. Thereafter, the crystals are separated from the liquid and recovered.

It should be realized that the reaction mixture components can be supplied by more than one source. The reaction mixture can be prepared either batch-wise or continuously. Crystal size and crystallization time of the new crystalline material will vary with the nature of the reaction mixture employed and the crystallization conditions.

Synthesis of the ITQ-12 may be facilitated by the presence of at least 0.01 percent, preferably 0.10 percent and still more preferably 1 percent, seed crystals (based on total weight) of crystalline product.

The crystalline material produced by the present process may be subjected to treatment to remove part or all of the organic directing agent and/or fluoride used to assist in the synthesis. Removal of the organic directing agent is conveniently effected by thermal treatment in which the as-synthesized material is heated at a temperature of at least about 370° C. for at least 1 minute and generally not longer than 40 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions. Removal of the fluoride can be effected by the thermal treatment used to remove the organic directing agent and/or by ion exchange.

The present crystalline material can be used, particularly in its aluminosilicate form, as a catalyst in a wide variety of chemical conversion processes including many of present commercial/industrial importance. An example of such a process is the conversion of methanol to olefins and other chemicals at reaction conditions including a temperature of between about 500° F. (260° C.) and about 1000° F. (540° C.), a pressure from about 0.1 to 30 atmospheres and a weight hourly space velocity of between about 0.1 and about 30.

In addition, the present crystalline material can be used as an adsorbent in gas separation, such as the separation of propane and propene mixtures. An example of such a separation process is described in U.S. Pat. No. 6,730,142, the entire disclosure of which is incorporated herein by reference.

Example 1

Synthesis of 1,2,4,6-tetramethylpyridinium hydroxide (TMPyOH)

To a 250 ml plastic bottle were added 40.0 g 2,4,6-trymethylpyridine (2,4,6-collidine) and 100 ml ethanol. The mixture was shaken until a clear solution was obtained. To the solution were slowly added 56.22 g (1.2 equivalent, in three portions) methyl iodide and then the bottle was capped and placed in a 40° C. oven for two days. Crystals had formed over this period of time. Upon chilling in refrigerator, more crystals appeared and they were isolated by decanting. A second batch of crystal was obtained by concentrating the mother liquor from the first batch of crystals through evaporation of ethanol, followed by chilling in refrigerator and decanting.

The combined two batches of 1,2,4,6-tetramethylpyridinium (TMPy) iodide crystals were dissolved in 100 ml deionized water. 100 g MTO-Dowex SBR LCNG OH Form Ion-Exchanger (Supelco) were added and the mixture stirred at room temperature for 30 minutes. The ion-exchanger was then filtered and washed with deionized water. The ion-exchange step was repeated twice more, until the filtrate was tested negative for iodide with AgNO$_3$.

The combined solution of 1,2,4,6-tetramethylpyridinium hydroxide was 500 g, and the molar concentration was determined to be 0.4155 by titration with HCl. This result corresponded to an overall synthesis yield of 63.0%. This template solution was stored in refrigerator as a precaution to prevent decomposition.

Example 2

Synthesis of Siliceous ITQ-12

A portion of the 1,2,4,6-tetramethylpyridinium hydroxide (TMPy) solution produced in Example 1 was added to tetraethylorthosilicate (TEOS), and the mixture was shaken at room temperature for three days to allow hydrolysis of TEOS. 48% HF was added to the mixture, which caused formation of a white precipitate. The mixture was shaken vigorously and evaporation of solvents (ethanol and water) ensued. Evaporation was stopped when the final mixture composition was:

0.86TMPy:0.5HF:1SiO$_2$:5H$_2$O 10 g of this synthesis mixture was sealed in a Teflon-lined autoclave, which was then heated in an oven at 170° C. while being tumbled at 40 rpm. The autoclave was cooled after 14 days. The solid product was centrifuged and washed with deionized water five times, and was dried in a vacuum oven at 60° C.

The product was analyzed by XRD which indicated that it was ITQ-12. The product was then calcined in air at 650° C. for 20 hours so that a completely white product was obtained. The XRD patterns of the as-synthesized and calcined products are shown in FIG. 1 and show good agreement with the peak positions and intensities reported for ITQ-12.

Example 3

Synthesis of Ge-Containing ITQ-12

The procedure of Example 2 was repeated, but with the addition of GeO$_2$ to the TEOS/TMPy hydroxide mixture. The following mixture composition was reached after solvent evaporation:

0.50TMPy:0.5HF:0.2GeO$_2$:0.8SiO$_2$:5H$_2$O 7 g of this mixture was sealed in a Teflon-lined autoclave, which was heated at 180° C. for 4 days while being tumbled at 40 rpm. The solid product was identified as ITQ-12 by X-ray diffraction, and was analyzed to contain 27.0 wt % Si and 16.4 wt % Ge. The Si/Ge molar ratio was 4.52.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for synthesizing a crystalline material having an ITQ-12 framework structure, the process comprising:
   a) forming a reaction mixture capable of forming said crystalline material having an ITQ-12 framework structure, wherein the reaction mixture comprises an organic directing agent having the following formula:

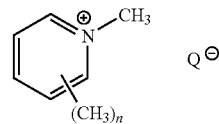

where n is an integer from 1 to 3 and Q$^-$ is an anion; and
   b) recovering from said reaction mixture said crystalline material having an ITQ-12 framework structure.

2. The process of claim 1 wherein said directing agent is a 1,2,4,6-tetramethylpyridinium compound.

3. The process of claim 1 wherein said directing agent is 1,2,4,6-tetramethylpyridinium hydroxide.

4. A crystalline material having an ITQ-12 framework structure as synthesized by the process of claim 1.

5. A process for synthesizing a crystalline material having an ITQ-12 framework structure and having a composition involving the molar relationship:

($m$)X$_2$O$_3$:YO$_2$, wherein X is at least one trivalent element; Y is at least one tetravalent element; and m is 0 to 0.2, the process comprising:
   a) preparing a reaction mixture capable of forming said crystalline material having an ITQ-12 framework structure, said reaction mixture comprising a source of water, a source of an oxide of at least one tetravalent element Y, optionally a source of an oxide of at least one trivalent element X, and an organic directing agent for directing the formation of an ITQ-12 framework structure molecular sieve and having the formula:

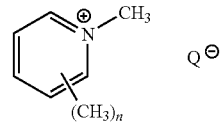

where n is an integer from 1 to 3 and Q$^-$ is an anion; and
   b) maintaining said reaction mixture under conditions sufficient to form crystals of said crystalline material; and
   (c) recovering said crystalline material from (b).

6. The process of claim 5 wherein said directing agent is a 1,2,4,6-tetramethylpyridinium compound.

7. The process of claim 5 wherein said directing agent is 1,2,4,6-tetramethylpyridinium hydroxide.

8. The process of claim 5 wherein said reaction mixture also comprises a source of fluoride ions.

9. The process of claim 5 wherein X is a trivalent element selected from the group consisting of boron, iron, indium, gallium, aluminum, and a combination thereof.

10. The process of claim 5 wherein Y is a tetravalent element selected from the group consisting of silicon, tin, titanium, germanium, and a combination thereof.

11. The process of claim 5 wherein Y comprises silicon.

12. The process of claim 5 wherein Y comprises silicon and germanium.

13. The process of claim 5 wherein m is zero.

* * * * *